United States Patent [19]

Bard et al.

[11] Patent Number: 5,661,290
[45] Date of Patent: Aug. 26, 1997

[54] SCANNER WITH FLEXIBLY SUPPORTED LIGHT EMITTER

[75] Inventors: Simon Bard, Setauket; Yajun Li, Oakdale; Jerome Swartz, Old Field; Boris Metlitsky; Joseph Katz, both of Stony Brook; Askold Strat, Patchogue; Harold Charych, East Setauket, all of N.Y.

[73] Assignee: Symbol Technologies, Inc., Holtsville, N.Y.

[21] Appl. No.: 597,882

[22] Filed: Feb. 7, 1996

Related U.S. Application Data

[62] Division of Ser. No. 218,959, Mar. 28, 1994, Pat. No. 5,536,925, which is a division of Ser. No. 897,664, Jun. 12, 1992, Pat. No. 5,374,817, which is a continuation-in-part of Ser. No. 787,458, Nov. 4, 1991, abandoned, which is a continuation-in-part of Ser. No. 699,417, May 13, 1991, Pat. No. 5,191,197, which is a continuation-in-part of Ser. No. 193,265, May 11, 1988, Pat. No. 5,144,120.

[51] Int. Cl.[6] .................................................. G06K 7/10
[52] U.S. Cl. ..................... 235/462; 235/470; 235/472; 359/214; 359/225
[58] Field of Search ........................... 359/214, 225; 235/462, 470, 472

[56] References Cited

U.S. PATENT DOCUMENTS

| | | |
|---|---|---|
| 1,438,974 | 12/1922 | Wente . |
| 1,980,888 | 11/1934 | Thomas . |
| 2,290,529 | 7/1942 | Black, Sr. . |
| 3,508,814 | 4/1970 | Aas . |
| 3,532,408 | 10/1970 | Dostal ................................ 359/214 |
| 3,544,201 | 12/1970 | Fowler et al. . |
| 3,612,642 | 10/1971 | Dostal . |
| 3,614,677 | 10/1971 | Wilfinger . |
| 3,700,304 | 10/1972 | Dostal et al. . |
| 3,758,199 | 9/1973 | Thaxter . |
| 3,794,410 | 2/1974 | Elliott . |
| 3,902,783 | 9/1975 | Bodlaj . |
| 3,981,566 | 9/1976 | Frank et al. . |
| 3,988,092 | 10/1976 | Bloxham et al. . |
| 4,025,203 | 5/1977 | Lee . |
| 4,170,397 | 10/1979 | Botcherby et al. . |
| 4,230,393 | 10/1980 | Burke, Jr. . |
| 4,251,798 | 2/1981 | Swartz et al. . |
| 4,360,798 | 11/1982 | Swartz et al. . |
| 4,369,361 | 1/1983 | Swartz et al. . |
| 4,387,297 | 6/1983 | Swartz et al. . |
| 4,409,470 | 10/1983 | Shepard et al. . |
| 4,410,235 | 10/1983 | Klement ................................ 385/4 |
| 4,436,364 | 3/1984 | Lauer et al. . |
| 4,460,120 | 7/1984 | Shepard et al. . |
| 4,496,831 | 1/1985 | Swartz et al. . |
| 4,577,131 | 3/1986 | Soobitsky . |
| 4,578,571 | 3/1986 | Williams ................................ 235/472 |
| 4,593,186 | 6/1986 | Swartz et al. . |
| 4,607,156 | 8/1986 | Koopenaal et al. . |
| 4,673,803 | 6/1987 | Zerle et al. . |
| 4,708,420 | 11/1987 | Liddiard . |
| 4,746,095 | 5/1988 | Roush . |
| 4,758,717 | 7/1988 | Shepard et al. . |
| 4,760,248 | 7/1988 | Swartz et al. . |
| 4,769,803 | 9/1988 | Yamamiya . |

(List continued on next page.)

FOREIGN PATENT DOCUMENTS

| | | | |
|---|---|---|---|
| 425844 | 5/1991 | European Pat. Off. .............. 235/472 |
| 63-206718 | 8/1988 | Japan ............................ 359/214 |
| 2-278391 | 11/1990 | Japan ............................ 235/472 |

*Primary Examiner*—Donald T. Hajec
*Assistant Examiner*—Michael G. Lee
*Attorney, Agent, or Firm*—Kirschstein, et al.

[57] ABSTRACT

To reduce the size and weight of an optical scanner, the present invention provides a mirrorless beam scanning unit. A flexible support structure, such as one or more strips of mylar, movably mounts the light emitter in response to a motive force, for example as might be applied by a combination of a permanent magnet coupled to the light emitter and a fixedly mounted electromagnet driven by an alternating current signal. Reciprocation of the light emitter during emission of light by the light emitter causes the light to scan a surface, such as a surface bearing a bar code label.

19 Claims, 6 Drawing Sheets

U.S. PATENT DOCUMENTS

| | | |
|---|---|---|
| 4,775,815 | 10/1988 | Heinz . |
| 4,778,233 | 10/1988 | Christenson et al. . |
| 4,784,448 | 11/1988 | Sepp et al. . |
| 4,806,742 | 2/1989 | Swartz et al. . |
| 4,808,804 | 2/1989 | Krichever et al. . |
| 4,816,660 | 3/1989 | Swartz et al. . |
| 4,816,661 | 3/1989 | Krichever et al. . |
| 4,845,350 | 7/1989 | Shepard et al. . |
| 4,871,904 | 10/1989 | Metlitsky et al. . |
| 4,902,083 | 2/1990 | Wells . |
| 4,923,281 | 5/1990 | Krichever et al. . |
| 5,015,831 | 5/1991 | Eastman et al. ............ 235/462 |
| 5,047,625 | 9/1991 | Iima et al. . |
| 5,097,354 | 3/1992 | Goto ............................ 359/212 |
| 5,115,120 | 5/1992 | Eastman ...................... 235/462 |
| 5,170,277 | 12/1992 | Bard et al. ................... 235/462 |
| 5,329,103 | 7/1994 | Rando .......................... 235/470 |

SCANNER WITH FLEXIBLY SUPPORTED LIGHT EMITTER

CROSS REFERENCE TO RELATED APPLICATIONS

This application is a division of application Ser. No. 08/218,959, filed Mar. 28, 1994, now U.S. Pat. No. 5,536,925 which is in turn a division of application Ser. No. 07/897,664, filed Jun. 12, 1992, now U.S. Pat No. 5,374,817, which is in turn a continuation-in-part of application Ser. No. 07/787,458, filed Nov. 4, 1991, now abandoned, which is in turn a continuation-in-part of application Ser. No. 07/699,417, filed May 13, 1991, now U.S. Pat. No. 5,191,197, which is in turn a continuation-in-part of application Ser No. 07/193,265, filed May 11, 1988, now U.S. Pat. No. 5,144,120, all of which are herein entirely incorporated by reference.

TECHNICAL FIELD

The present invention relates to optical scanners for optically reading information, such as bar codes. In particular, this invention relates to small light weight scanner structures which do not require a moving mirror to scan a light beam across the information.

BACKGROUND ART

Optical readers, such as bar code readers, are now quite common. Typically, a bar code comprises a series of encoded symbols, and each symbol consists of a series of light and dark regions, typically in the form of rectangles. The widths of the dark regions, the hats, and/or the widths of the light spaces between the bars indicate the encoded information. A bar code reader illuminates the code and senses light reflected from the code to detect the widths and spacings of the code symbols and derive the encoded data.

Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the bar code readers. The readers therefore must be easy and convenient to operate.

A variety of scanning devices are known. One particularly advantageous type of reader is an optical scanner which scans a beam of light, such as a laser beam, across the symbols.

Laser scanner systems and components of the type exemplified by U.S. Pat. Nos. 4,251,798; 4,360,798; 4,369,361; 4,387,297; 4,593,186; 4,496,831; 4,409,470; 4,460,120; 4,607,156; 4,673,803; 4,736,095; 4,758,717; 4,816,660; 4,808,804; 4,816,661; 4,760,248; 4,871,904; 4,806,742; and 4,845,350, as well as U.S. application Ser. Nos. 07/148,669 and 07/147,708—all of these patents and patent applications being owned by the assignee of the instant invention and being incorporated by reference herein—have generally been designed to read indicia having parts of different light reflectivity, e.g., bar code symbols, particularly of the Universal Product Code (UPC) type, at a certain working or reading distance from a hand-held or stationary scanner.

In a typical optical scanner system, a light source such as a laser generates a light beam which is optically modified to form a beam spot of a certain size at the working distance and is directed by optical components along a light path toward a bar code symbol located in the vicinity of the working distance for reflection from the symbol. A photodetector having a field of view extending across and slightly past the symbol detects light of variable intensity reflected off the symbol and generates electrical signals indicative of the detected light. A scanning component is situated in the light path. The scanning component may either sweep the beam spot across the symbol and trace a scan line across and past the symbol, or scan the field of view of the photodetector, or do both.

A digitizer, associated with or included in the scanner, processes the analog signal to produce a pulse signal where the widths and spacings between the pulses correspond to the widths of the bars and the spacings between the bars. The digitizer serves as an edge detector or wave shaper circuit, and the threshold value set by the digitizer determines what points of the analog signal represent bar edges. The pulse signal from the digitizer is applied to a decoder. The decoder first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard the scanned symbol conforms to. This recognition of the standard is typically referred to as autodiscrimination.

Often the particular application for the bar code reader requires that the optical scanner be constructed in the form of a handheld unit, typically in the form of a pistol. The user points the scanner at the object and operates a trigger to activate the scanning of the bar code. In these handheld units, a light source, such as a visible laser diode (hereinafter VLD) emits a beam of light. To scan the beam across an image, the beam is reflected from a mirror and the mirror is moved in an oscillatory fashion. The oscillation of the mirror causes the reflected beam to scan back and forth in a desired pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternate circumferential directions about a drive shaft on which the multi-mirror construction is mounted.

In optical scanners of the type discussed above, the mirror and means to oscillate the mirror add size and weight to the handheld scanner. In applications involving protracted use, a large heavy handheld unit can produce fatigue when use of the scanner produces fatigue or is in some way inconvenient, the user is reluctant to operate the scanner, which defeats the data gathering purposes for which bar code systems are intended.

Another problem with scanners of the type discussed above relates to the scan field and the size of the spot at the point where the beam impacts on the information. In scanning applications, such as reading bar codes, it is important to maintain the spot size of the beam on the scanned surface essentially at a constant across the entire length of the scanned information. Lasers emit a narrow core of radiation referred to as the laser beam. The beam cross-section varies as the laser beam propagates, particularly after focusing thereof by a lens. The minimum beam diameter is called the "beam waist." In the prior art, the scanning element, e.g. the moveable mirror, typically is positioned after the objective lens so as to scan the focused beam. Such scanning is referred to as "post objective" scanning. The objective lens in such scanners only needs to be slightly larger than the beam, and the scanning mirror can be somewhat smaller than the beam diameter. The mirror rotation, however, produces a curved or arcuate scan of the focal point of the beam. This curved scan field means that the focal point of the beam actually moves into and out of the plane of the information being scanned, and the part of the beam which impacts the plane of the information changes. Consequently, the spot size changes substantially from point to point along the scan line on the information surface. Such variations in spot size cause the intensity of light reflection sensed by the photodetector to vary, which may interfere with accurate sensing of reflection variations due to variations in the scanned information.

In non-laser scanning systems of the type exemplified by U.S. Pat. No. 4,578,571, a non-laser light emitting diode, an optical assembly, a photodetector, and electronic preamplifier/filter circuitry are all fixedly mounted on a common support that is connected to a cantilevered bimorph which is reciprocally driven to jointly move all the aforementioned components back and forth over a bar code symbol to be scanned. The large volume and heavy mass of all the commonly mounted non-laser system components require the expenditure of a great deal of power for the driver. This is not altogether practical in those cases, e.g. battery-powered operation, where power consumption is to be held to a minimum. Also, moving only one or more non-mirrored system components relative to another for conserving power was heretofore not considered desirable, because of optical alignment problems.

The components for the light scanning system, including the light source, optics, photo-detector, scanning component and an electrical conductor, can be mounted together in a common assembly to constitute a compact, lightweight, scan module. Such a scan module is mounted in an interchangeable, modular manner in housings of different configurations. For example, the housing can be hand-held and shaped as a cylinder in a so-called flashlight-type configuration, or shaped as a box, or shaped with a gun-like configuration. The housing can be mounted on the back of an operator's arm (see, for example, U.S. Pat. No. 4,766,299) or on one or more fingers of the operator's hand, typically with the aid of a strap, a clip, or a glove. The housing can be mounted on a countertop workstation. The housing can be mounted in a mobile cart, or shopping cart, or, in some cases, even in a stationary installation.

Commonly assigned application Ser. No. 07/193,265 filed May 11, 1988 discloses a mirrorless optical scanner, and application Ser. No. 07/699,417 filed on May 13, 1991 discloses incorporation of such a scanner in a modular scanner component system facilitating use of the scanner in a variety of different housing configurations.

A need still exists, however, to further reduce the size and weight of the scanner unit and to provide a particularly convenient scanner system. The mass of the moving components should be as low as possible to minimize the power required to produce the scanning movement and to facilitate operation at high scanning speeds.

DISCLOSURE OF THE INVENTION

Objectives

The objective of this invention is to provide a scanner which is smaller and lighter weight, particularly when held by an operator, and which is easier to manipulate to scan encoded data.

A further objective is to produce a durable robust scanning system at a relatively low cost.

To reduce weight and achieve a higher degree of miniaturization, it is a specific object of this invention to eliminate the mirror from the optical scanner.

Another objective of the invention is to reduce the mass of the components which actually move to scan the beam o This mass reduction reduces the power required to produce the movement and facilitates operation of the scanner at high scanning frequencies.

A further objective of the invention is to design the optics and scanning system to automatically compensate for variations in the beam spot size at the point the beam impacts on the surface of the optically encoded information due to the curved field produced by the motion of the scanning element.

Summary

In one aspect, the invention is a mirrorless optical scanner including a light emitter and an objective lens for focusing light from the emitter on a surface of information to be scanned. A flexible member movably supports the light emitter. The flexible member permits lateral movement of the light emitter. The scanner also includes means for laterally reciprocating the light emitter to cause the light to scan the surface.

The flexible member provides a small light weight scanner. Also, the mass of the moving components is small to facilitate low power operation and operation at high scanning speeds. The objective lens can be a condenser lens of glass or plastic; however, to further reduce size and mass, the invention uses a fresnel lens.

A number of different structures can serve as the flexible member for supporting the emitter. For example, the lens could be supported by a pair of convoluted diaphragm springs or a so-called spider spring. In the presently preferred form, the flexible member comprises a pair of flexible strips made from mylar film. The lens is supported between edges of the flat mylar strips at a moveable end of the strips. The opposite ends of the strips are secured to a relatively fixed structure, e.g., a point on a chassis. The mylar film strip construction of the flexible means for mounting the emitter provides a relatively inexpensive and durable type of flexible structure.

The means for laterally reciprocating can take a number of different forms but preferably comprise a permanent magnet and a coil held in a fixed position in proximity to the permanent magnet. When an alternating current signal is applied to the electromagnet it produces a magnetic field which acts on the permanent magnet to oscillate the permanent magnet and the attached emitter. This magnetic drive system can be quite small and light weight, yet it operates at high frequencies in response to low power drive signals.

In one preferred embodiment, the invention comprises a coil and bobbin with a flexible member concentrically mounted within the bobbin. This flexible member supports the laser diode. A permanent magnet is attached to the laser diode. The permanent magnet can take the form of a circular magnet surrounding a visible laser diode type emitter. An alternating current applied to the coil produces a torque on the permanent magnet. As a result, the flexibly mounted light emitter oscillates in its flexible mounting structure.

The invention uses a number of configurations for mounting the light emitter and the flexible mounting means. For example, in an embodiment using a laser diode emitter, and mylar strips to flexibly mount an objective lens, two plates are bolted together to clamp the diode and the fixed ends of the mylar strip.

In a different aspect, the invention provides a flat wire flexible cable to connect to a movably mounted light emitter. The light emitter can be one mounted for reciprocal movement in the manner discussed above. Alternately, the moveable light emitter could be a laser diode or the like mounted on the output shaft of a motor.

In a further aspect, the inventive scanning modules are incorporated into a scanning unit. The scanning unit includes one of the above discussed modules, to produce a moving beam for optically scanning a surface on which encoded indicia of varying reflectivity are formed. The scanning unit also includes a photodetector for sensing light reflected from the scanned surface and producing a proportional electrical signal.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
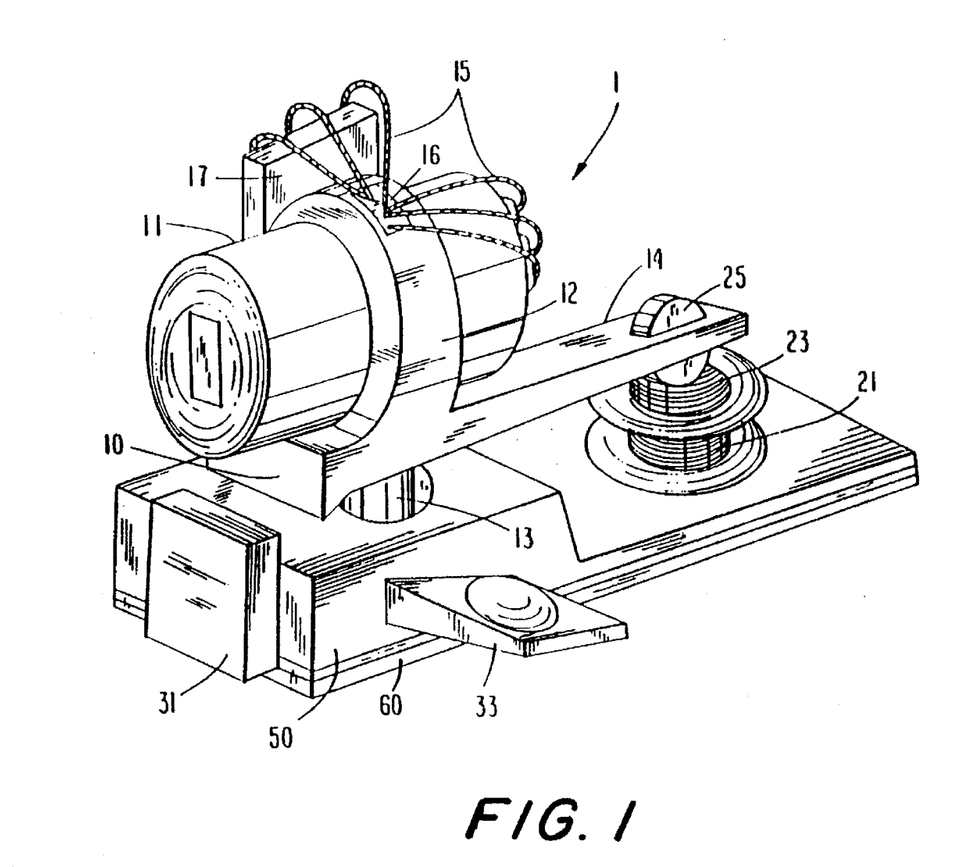
FIG. 1 is an isometric view of a first embodiment of the mirrorless scanner of the present invention, wherein the, light emitter reciprocates.

FIG. 1 depicts a mirrorless scanning unit 1 of the present invention. A light emitter, such as a visible laser diode or VLD 11, emits a beam of light to generate a scan line. The VLD 11 may be mounted on the pivotable shaft of a motor or on any material means capable of producing oscillating motion.

In the preferred embodiment of scanning unit 1, the VLD 11 is attached to the top end of a rotatable or pivotable shaft 13. The shaft 13 is pivotably mounted in a scanner base 50. The shaft can be installed either on any known type of bearing or just to rotate in the plastic body of base 50. The VLD 11 and shaft 13 together form a moving assembly 10 for scanning the beam of light from the VLD type light emitter. The moving assembly 10 also includes a collar 12 and a lever arm 14 attached to the shaft 13. A force applied to the end of lever arm 14 produces the oscillatory movement of assembly 10, as will be discussed later.

The collar 12 secures the VLD 11 to the moving assembly 10. In the preferred embodiment, the VLD 11 is secured at a point atop of the shaft 13, such that the VLD 11 is effectively located on the pivot axis of the shaft 13 and aligned to emit light in a direction perpendicular to the axis of the shaft. Other arrangements of the VLD and shaft are possible. For example, the VLD could be located at a position offset from the axis. Also, the collar could support the VLD at an angle with respect to the shaft.

Figure 2:
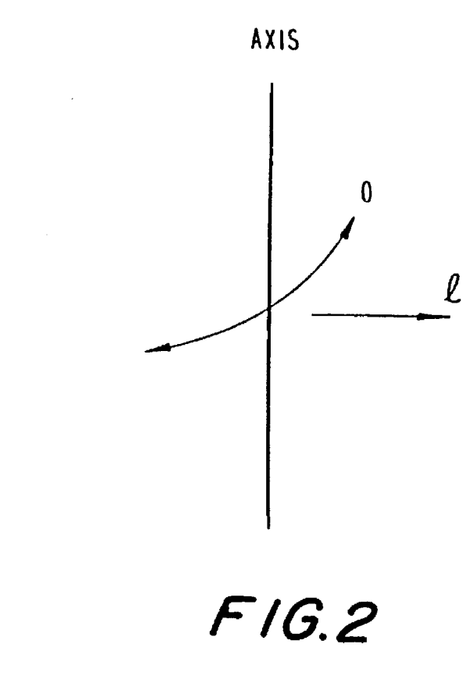
FIG. 2 is a diagram showing the rotational arc of the emitter oscillation and the direction in which light is emitted.

FIG. 2 illustrates the relationship of the motion and light emission of the VLD 11 to the axis of the shaft 13. The short rotational arc o about the shaft axis represents the back and forth pivotal oscillation of the VLD 11. The VLD 11 emits light in direction ℓ toward a targeted object, such as a bar code (not shown). As the VLD 11 of assembly 10 oscillates back and forth through the small rotational arc o, the emitted light ℓ will scan back and forth across the targeted image. Typically, the targeted image will be an indicia having varying reflective characteristics which represent information For example, the image code comprises a series of bars, with spaces therebetween, which together form a bar code symbol.

As shown in FIG. 1, three thin wires 15 connect the leads of the VLD 11 on one side to a stationary holder 17 on the other. Alternatively, one flexible cable could be used. In the preferred embodiment, the wires 15 or cable are attached to an intermediate fixing point 16 atop the collar 12. The point 16 is located on the axis of the oscillation of moving assembly 10 and shaft 13 to minimize tension on the lead wires due to the zero linear speed at that point. Alternatively, the wires could be slack and hang loose or be coiled, so long as the wires provide a flexible connection o the oscillating VLD. In embodiments discussed later with respect to FIGS. 25 to 27, the wires comprise a flexible flat wire cable.

A variety of devices can be used to provide the force to oscillate the moving assembly 10 about the axis of shaft 13. In the illustrated embodiment, the oscillation of the assembly is provided by a so-called induced magnetization motor (hereinafter IMM).

The IMM type motor has been disclosed in commonly assigned application Ser. No. 07/520,464, filed on May 8, 1990, entitled SCANNING ARRANGEMENT, which is herein incorporated entirely by reference. In that prior application the IMM oscillated a scanning mirror. In the IMM type motor, a restoring force is provided by the combination of a fixed position core and coil with a moveable permanent magnet. In embodiments using the flexible flat wire cable, the flat wire also provides a restoring force. If the permanent magnet is mounted on the end of a lever arm attached to a rotatable shaft, the force takes the form of a torque about the axis of the shaft.

In the present embodiment of the IMM, a core 21 comprises a bobbin around which the coil 23 is wound such that the core and coil are entirely concentric to minimize size and weight. The permanent magnet 25 is rigidly mounted at the end of the lever arm 14 of the moving assembly 10. Location of the permanent magnet 25 at a distance from the axis of the shaft 13 causes the magnetic force applied to the lever arm 14 through the permanent magnet 25 to produce a torque about the axis of the shaft 13.

The core 21 is made of a soft steel to prevent residual magnetization and is magnetically neutral in this case. When there is no current through the coil 23, axially magnetized permanent magnet 25, which is attached to the moving assembly through the lever arm, positions itself above the central axis of the core 21 by the attraction of the magnet 25 to the steel of the core 21. Thus, with no current flowing through coil 23, the moving assembly returns to its rest position at the center of its rotational arc, i.e. facing straight forward.

When a current is introduced through the coil 23, interaction between magnetic fields of the coil and the permanent magnet 25 causes the magnet (with the attached moving assembly) to move from an equilibrium position. As a result of such motion, however, the core becomes increasingly magnetized, thus creating a force (two unlike magnetic poles phenomena) which is trying to bring the permanent magnet 25 and the assembly 10 back to the rest position. The magnitude of this force depends on the amount of current through the coil 23, the airgap size between the permanent magnet 25 and a core surface, the size and the material of the core 21, etc. Reversing the polarity of the applied current will reverse the directions of the magnetic forces at work within the IMM. Therefore, if the current applied to the coil takes the form of a cyclical AC signal, such as a sign wave, a pulse Signal, a triangular wave, etc., the induced magnetic forces will produce an oscillatory movement of the permanent magnet 25 and the attached moving assembly 10.

Although the IMM is preferred for the embodiment of FIG. 1, other arrangements could produce the necessary oscillatory motion. For example, the VLD 11 could be installed on the rotating shaft of a motor (see, e.g., FIG. 7). Also, if the IMM is used, other arrangements for mounting the VLD and connecting the moving assembly to the IMM are within the scope of the present invention. For example, in place of the shaft and lever arm arrangement shown in the drawings, the permanent magnet and VLD could both be mounted on a moveable or flexible bridge support directly over the bobbin coil so that the permanent magnet and VLD oscillate laterally together in response to the cyclical AC signal applied to the bobbin coil.

When used as a scanner for reading optically amplification stages may be provided on a printed circuit board 60 shown attached to the bottom of the scanner base 50. The pre-amplification and amplification stages convert a current from photodiode 31 into an electrical signal to be sent to digitizer and the rest of a processing circuitry contained in a separate unit.

A trigger button 33 is mounted on one side of the unit. A user operates button 33 to activate the unit.

In an embodiment actually built, the mirrorless scanning unit was only 1" long, by 1.25" high, by 0.625" wide. The exterior dimensions of a housing containing the mirrorless scanner are 1.1" long, by 1.4" high, by 0.7" wide. It takes only 13.5 mA and 3.5 V to operate the mirrorless scanner. Scan angle is ±20°. Unit weight is less than one ounce (27.5 grams). Such a small scanner unit could easily be worn on a finger like an ordinary ring, leaving the operator's hands (including that finger) absolutely free.

The working range or decode zone can be changed by refocusing the VLD (for the beginning of the working range) and by the installation of a Fresnel lens in front of the photodiode or by using a photodiode with a larger sensitivity and active area.

Figure 3:
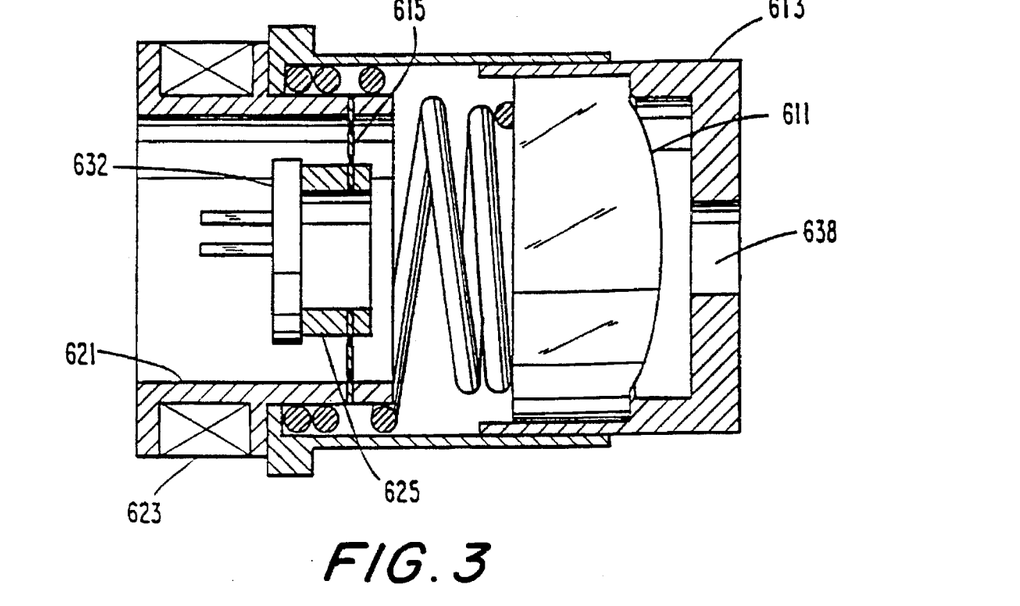
FIGS. 3 to 5 are cross sectional views of still further embodiments of the invention.

FIG. 3 shows a second embodiment of the mirrorless scanner. The scanner 1' of FIG. 3 is generally similar to the scanner 1 shown in FIG. 1, and like reference numerals indicate corresponding elements of the scanner in each drawing. As shown in FIG. 3, two thin wires 15' connect the leads of the photodiode 31' to the stationary holder 17'. The wires 15' are attached to the intermediate fixing point 16 atop the collar 12 in the same manner as the wires 15 from VLD 11.

Figure 4:
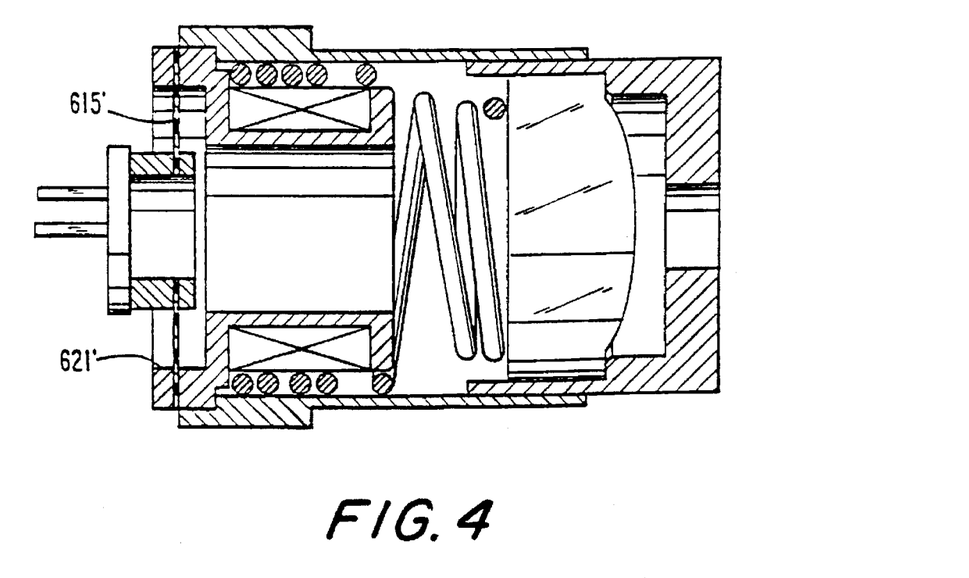
Figure 5:
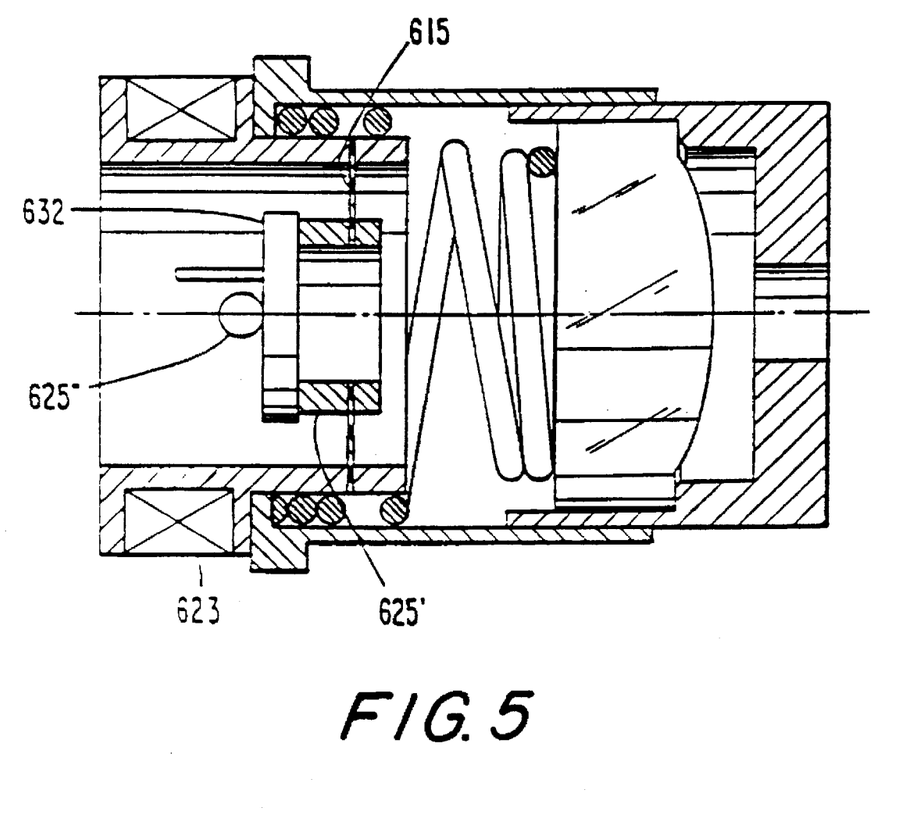

FIGS. 3 to 5 are cross sectional views of still further embodiments of the invention wherein the lens, drive magnet assembly and laser diode are all positioned along a common axis and flexible members support the laser diode. Significant size reduction allows a module using this type of construction to be installed in a very limited space environments.

The module shown in FIG. 3 comprises an electromagnetic coil 623, a visible laser diode or VLD 632, a permanent ring magnet 625, a condenser lens 611, a flexible member 615 and a lens holder 613 with aperture 638. The flex is a flat strip of plastic, such as mylar or kaptan, or a flat strip of non-magnetic metal, for example a berrylium-copper alloy. The flex 615 is attached to the front of the bobbin 621 around which the coil 623, is wound. The flex 615 supports the cylindrical permanent magnet 625 mounted at the center of the flex. The permanent magnet 625 in turn supports the miniature VLD 632 in the center of the magnet. The lens holder 613 is installed near the front of the coil 623 and is connected to the coil bobbin 621 via springs.

As illustrated, the lens holder 613 is a two piece structure. The front piece supports the lens 611 and the rear piece connects to the bobbin 621. The two pieces of the holder 613 are different in size to allow one piece to telescope into the other, for example by sliding or screw threaded arrangements. As the two pieces telescope together, the distance between the lens 611 and the VLD 632 diminishes. This also changes the distance in front of the module at which the lens 611 focuses the light from the VLD 632. To adjust the focus of the module for a particular scanning application, a technician telescopes the two pieces of the holder together, against the expansion force provided by he spring, until the module focuses the laser beam at the desired distance in front of the module. The technician then attaches the two pieces of the holder 613 together, for example by injecting a transparent glue or by welding the two pieces together.

The cylindrical permanent magnet is aligned so that the axis between its north and south poles is perpendicular to the axis of coil. For example, the axis of magnet 625 could be perpendicular to the plane of FIG. 3. When current causes the coil 623 to produce a magnetic field, interaction of the magnetic field of the coil with that of the cylindrical permanent magnet 625 creates torque tending to force the axis of magnet 625 in line with the axis of coil 623. This torque causes the flex supporting the visible laser diode 632 to twist and produce a return force. If the current applied to coil 623 is an AC current, the alternations of the current produce alternations in the magnetic field produced by the coil. These alternations together with the return force prdocued by the flex cause the laser diode 632 to oscillate. After passing through the lens, a laser beam from the oscillating VLD 632 produces a scan line. If the axis of magnet 625 is perpendicular to the plane of FIG. 3, the resultant scan line would pass into and out of that plane.

The embodiments of FIGS. 4 and 5 are similar to that of FIG. 3 discussed above. In FIG. 4, however, the plastic (or metal) flex 615' is attached to the rear of the bobbin 621'. In FIG. 5, the plastic (or metal) flex 615 is attached to the front of the bobbin 621 around which the coil 623 is wound, as in FIG. 22. The flex 615 supports a ring member 625' mounted at the center of the flex. In the embodiment of FIG. 5, however, the ring 625' which supports the miniature VLD 632 may or may not be magnetic. A cylindrical magnet 625" is mounted on the rear of the miniature VLD 632.

Other arrangements of the flexible member, diode and permanent magnet are also possible, in embodiments similar to those shown in FIGS. 3 to 5. For example, a cylindrical magnet could be attached to one side of the flex, and the laser diode fixed to the opposite side of the flex. Another arrangement might include a laser diode assembly attached to the flex opposite the magnet.

For all of the versions such as shown in FIGS. 3 to 5, a double flexure or cross flexure can be used instead of single flexible trip.

Figure 6:
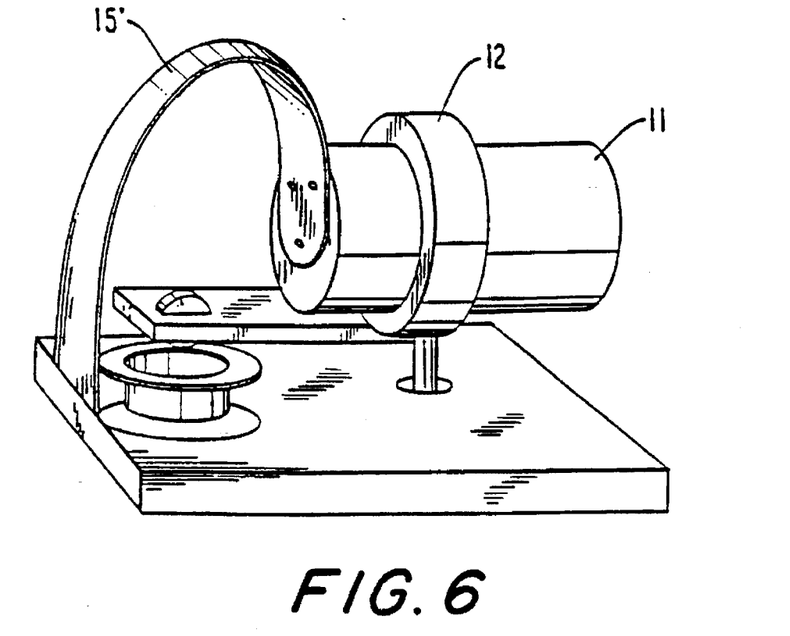
FIG. 6 shows an embodiment of the invention, similar to that of FIG. 1, using a flexible flat wire cable to provide the lead wire connection to the laser diode.

FIG. 6 shows an embodiment of the invention, similar to that of FIG. 1. The embodiment of FIG. 6, however, replaces the wire leads with a flat flexible multi-wire cable 15', often referred to as a "flex-cable," to provide the lead wire connection to the visible laser diode VLD 11. Typically the "flex-cable" might comprise a flat strip of Kaptan material with wires embedded therein. The flexible multi-wire cable 15' provides a durable connection which is not susceptible to breakage due to repeated flexure during oscillation of the laser diode. Also, the multi-wire cable provides part or all of the restoring force necessary to operate the device.

The multi-wire cable can take any of a number of forms and will typically comprise a flexible flat wire cable. Any other flexible flat wire cable could be used so long as the structure provides sufficient flexibility.

Figure 7:
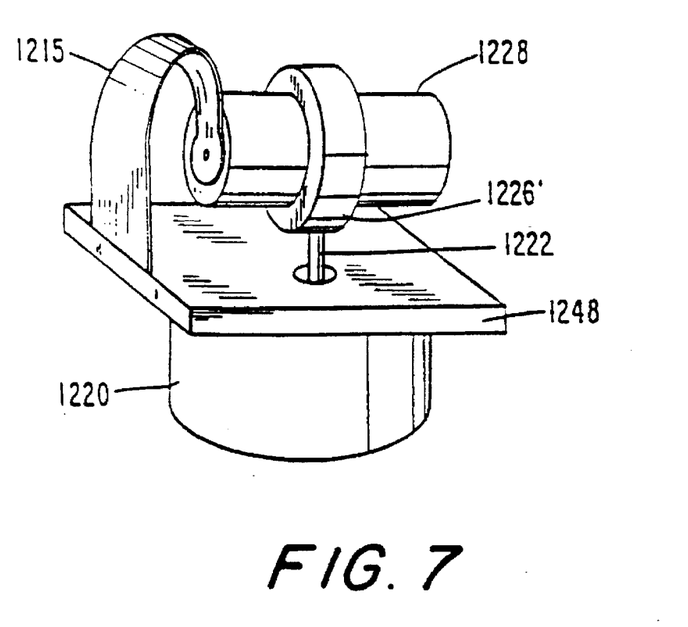
FIG. 7 shows another embodiment of the invention using a flexible flat wire cable to provide the lead wire connection to the laser diode.
Figure 8:
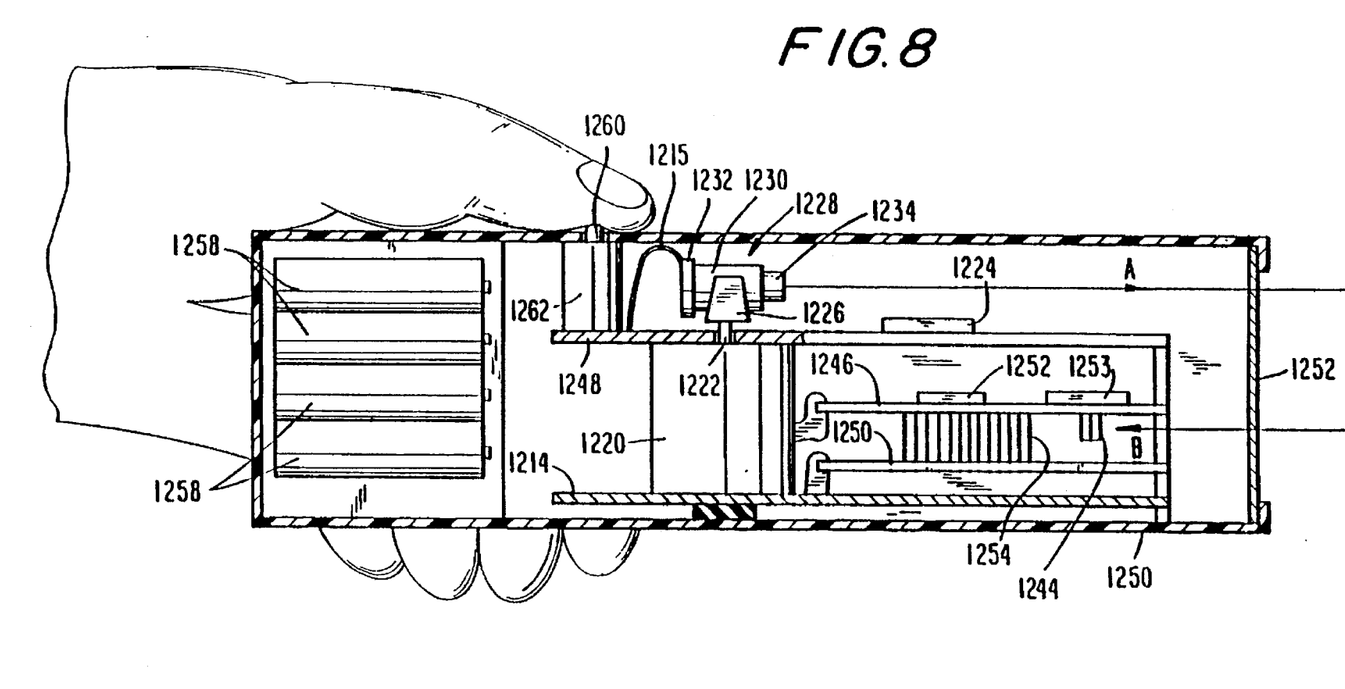
FIGS. 8 and 9 show moving spot optical scanners for reading bar codes, each of which incorporates a selected embodiment of the scanning module invention.

FIG. 7 also shows an embodiment of the beam scanner module using a flexible flat wire cable and FIG. 8 illustrates a handheld bar code reader incorporating that beam scanner module. The handheld arrangement illustrated in FIG. 7 comprises a handheld housing 1250 containing a lightweight, high-speed, miniature scanning motor 1220 similar to that described in U.S. Pat. No. 4,496,831. In this bar code reader, the housing 1250 is cylindrical, like the housing of a flashlight or a ball point pen. Because of the small size of the scanning module and associated electronics, the housing 1250 may have a diameter of one inch or less.

A base 1214 supports the scanning motor 1220. A printed circuit board 1248 supports a switch 1262 actuated by depression of rigger 1260, and control circuitry 1224 for providing the drive signals necessary to operate the laser and to control operation of the motor. The output shaft 1222 of the motor 1220 extends through an opening in circuit board 1248. The motor 1220 repetitively drives output shaft 1222 in alternate circumferential directions over arc lengths less than 360° in each direction about an axis along which the shaft extends. U.S. Pat. No. 4,496,831 provides structural, functional and operational details of the motor 1220 and of the associated motor control circuitry 1224.

A U-shaped or circular support structure 1226 is mounted at the end of the shaft 1222 of motor 1220. FIG. 7, for example, shows a circular support 1226' surrounding the laser emitter and optics assembly 1228. A flexible flat wire cable 1215 electrically connects the laser emitter and optics assembly 1228 to circuit board 1248.

In the optical reader of FIG. 8, the U-shaped structure 1226 supports the laser emitter and optics assembly 1228. As the motor 1220 repetitively drives output shaft 1222 in alternate circumferential directions, the subassembly 1228 and the support structure 1226 jointly oscillate and turn with the shaft 1222.

The subassembly 1228 includes an elongated hollow tube 1230, a laser diode 1232 fixedly mounted at one axial end region of the tube 1230, and a lens barrel 1234 mounted at the opposite axial end region of the tube 1230. The lens barrel contains a focusing lens (not shown); and the lens barrel may provide an aperture stop, if necessary, to define the beam diameter and thereby the effective sensing spot of the scanner. The focusing lens is preferably a plano-convex lens, but may be spherical, convex or cylindrical. U.S. Pat. No. 4,816,660 describes the subassembly 1228 in detail. The solid state laser diode 1232, of the subassembly 1228, generates an incident laser beam, either in the invisible or visible light range. The lens focuses the laser beam such that the beam cross-section or beam spot will have a certain waist size at distances within a working range relative to the housing 1250. The focused beam passes along path A through the window 1252; and during the alternate, repetitive oscillations of the shaft 1222, as the support 1226 and the subassembly 1228 concurrently oscillate, the beam spot sweeps in an arc across the encoded information or bar code symbol.

A portion of the light reflected off the symbol passes along a return path B back through the window 1250 to a photodetector 1244. Photodetector 1244 senses the variable intensity of the returning portion of the reflected laser light and generates an electrical analog signal indicative of the detected variable light intensity. In the illustrated embodiment, the photodetector 1244 is stationarily mounted on the circuit board 1246, but could be mounted on the support structure 1226 for scillation with the laser and optics subassembly 1228.

Printed circuit boards 1248 and 1250, on either side of the board 1246, contain signal processing circuitry 1252 and microprocessor circuitry 1253 for converting the analog electrical signal to a digital pulse signal and for deriving data representative of scanned bar code symbols from the digital pulse signal. A multi-wire cable 1254 electrically connects the signal processing circuitry and the microprocessor. Alternatively, in addition to the control circuitry 1224 for controlling operation of motor 1220 and the laser diode 1232, the printed circuit board 1248 may contain the signal processing circuitry and the microprocessor control circuitry. A battery pack 1258, mounted at the rear of housing 1250, supplies power for the scanning motor and all circuitry of the handheld bar code scanner arrangement.

To scan encoded information using the cylindrical handheld scanner, the user points the tip of the scanner at the information and activates the trigger button 1260. The laser diode 1232 emits a beam which scans the encoded information, and the photodetector 1244 outputs an analog electrical signal representative of any scanned symbols. A digitizer provided within signal processing circuitry 1252 processes the analog signal to produce a pulse signal where the widths and spacings between the pulses correspond to the widths of the bars and the spacings between the bars. The pulse signal from the digitizer is applied to the microprocessor 1253 for decoding. The microprocessor decoder first determines the pulse widths and spacings of the signal from the digitizer and then analyzes the widths and spacings to find and decode a legitimate bar code message. Typically, a cable carries the digital data representing the decoded characters to an associated computer or terminal (not shown).

Figure 9:
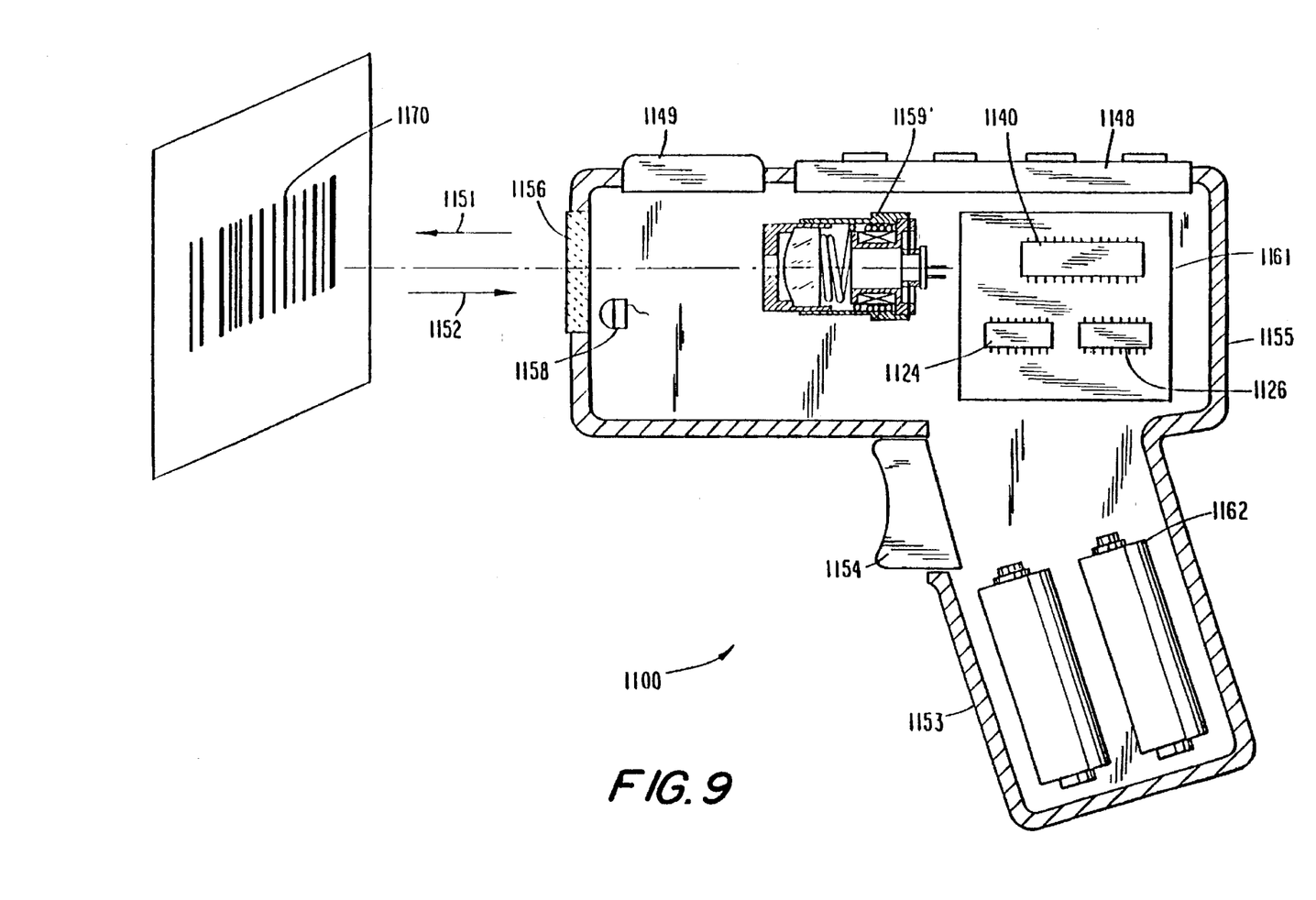

FIG. 9 shows a gun shaped moving spot optical scanner for reading bar codes. The version illustrated in FIG. 9 uses a scanning module 1159' corresponding to the embodiment of FIG. 4.

As depicted in these drawings, the bar code reader unit 1100 comprises a light weight plastic housing 1155 in the shape of a gun having a pistol-grip 1153. A user activates the light beam 1151 from the scanning module 1159 or 1159' by actuating trigger switch 1154. The gun shaped housing contains the scanning module 1159 or 1159' which produces the light beam 1151 and a photodetector 1158 for sensing reflected light. Batteries 1162, mounted within the pistol grip 1153 provide power to all elements of the handheld scanner unit 1100.

Printed circuit board 1161 is mounted near the rear of housing 1155. Printed circuit board 1161 contains control circuitry 1124 for producing the signals to drive the laser diode and the coil of the electro-magnet in the scanning module 1159 or 1159'. Printed circuit board 1161 also contains signal processing circuitry 1126 and microprocessor circuitry 1140 for converting the analog electrical signal to a digital pulse signal and for deriving data representative of scanned bar code symbols from the digital pulse signal.

A light transmissive window 1156 in the front end of the housing 1155 allows the outgoing light beam 1151 to exit and the incoming light 1152 reflected from symbol 1170 to enter. The reader 1100 is designed such that the user aims the gun shaped device at a bar code symbol from a position at which there is a space between the reader 1100 and symbol 1170. The front of the reader 1100 does not touch the surface on which symbol 1170 is formed. Instead, the operation of the scanning module 1159 or 1159' causes the beam to scan across the symbol.

The light from the diode within the scanning module 1159 or 1159' is typically in the visible light portion of the spectrum. As a result, the user can see the light from the source within the module as the beam scans across the surface on which the symbol 1170 is formed. The user employs this visible light to accurately aim the reader 1100 at the symbol.

The reader 1100 may also function as a portable computer terminal, and in such embodiments would include a keyboard 1148 and a display 1149, as described in U.S. Pat. No. 4,409,470.

FIGS. 8 and 9 show two different configurations of moving spot optical scanners for reading bar codes incorporating two selected embodiments of the scanning modules disclosed herein. The various scanning modules disclosed herein each can be used in either of the disclosed configurations or in a wide variety of other optical scanner configurations.

Clearly, the mirrorless scanners of the present invention provide a particularly small, light weight, durable, optical scanner. By appropriate selection of focal length, deflection angle and distance between the lens and the information surface, the objective lens scanning automatically compensates for variations in beam spot size.

What is claimed is:

1. A scan module, comprising:
   a light emitter for emitting light along an optical axis toward a surface to be scanned;
   a flexible member for supporting the light emitter for reciprocating movement relative to the surface; and
   means for reciprocating the light emitter and flexing the flexible member to sweep the light emitted by the light emitter across a portion of the surface, said reciprocating means including an energizable electromagnetic coil having a coil axis concentric with said optical axis.

2. The scan module according to claim 1, wherein the light emitter is a laser diode for emitting the light as a laser beam toward the surface on which a bar code symbol is present.

3. The scan module according to claim 1, wherein the flexible member is a generally planar strip of resilient material.

4. The scan module according to claim 1, wherein the reciprocating means includes a permanent magnet having north and south poles spaced apart along a magnet axis generally perpendicular to the coil axis in a rest position.

5. The scan module according to claim 4, wherein the permanent magnet generates a permanent magnetic field, and wherein the electromagnetic coil, when energized by an alternating electric current, produces an alternating magnetic field that interacts with the permanent magnetic field to create a torque tending to force the magnet axis in line with the coil axis and which twists the flexible member in opposite circumferential directions about a longitudinal axis along which the flexible member extends.

6. A hand-held bar code reader, comprising:
   a housing; and
   a scan module within the housing, the scan module including a light emitter for emitting light along an optical axis toward a surface to be scanned, a flexible member for supporting the light emitter for reciprocating movement relative to the surface, and means for reciprocating the light emitter and flexing the flexible member to sweep the light emitted by the light emitter across a portion of the surface, said reciprocating means including an energizable electromagnetic coil having a coil axis concentric with said optical axis.

7. A scan module, comprising:
   a light emitter for emitting light toward a surface to be scanned;
   a flexible member for supporting the light emitter for reciprocating movement relative to the surface; and
   means for reciprocating the light emitter and flexing the flexible member to sweep the light emitted by the light emitter across a portion of the surface, said reciprocating means including an energizable electromagnetic coil having a coil axis, and a permanent magnet having north and south poles spaced apart along a magnet axis generally perpendicular to the coil axis in a rest position, said coil being wound on a bobbin having an interior in which the light emitter is at least partly accommodated, and a casing axially adjacent and connected to the bobbin.

8. The scan module according to claim 7; and further comprising an objective lens mounted inside and held within the casing, and an aperture stop extending through a front end wall of the casing, and wherein the objective lens and the aperture stop serve to focus the light emitted by the light emitter.

9. The scan module according to claim 8, wherein the casing includes two casing parts axially movable relative to each other in a set-up mode, and a compression spring located between the objective lens and the bobbin.

10. A scan module, comprising:
    a light emitter for emitting light toward a surface to be scanned;
    a flexible member for supporting the light emitter for reciprocating movement relative to the surface; and
    means for reciprocating the light emitter and flexing the flexible member to sweep the light emitted by the light emitter across a portion of the surface, said reciprocating means including an energizable electromagnetic coil having a coil axis, and a permanent magnet having north and south poles spaced apart along a magnet axis generally perpendicular to the coil axis in a rest position, said permanent magnet being a ring surrounding and holding at least a part of the light emitter.

11. The scan module according to claim 10, wherein the coil is wound on a bobbin having an interior, and wherein the flexible member spans the interior of the bobbin in a direction transverse to the coil axis and supports the magnet ring and, in turn, the light emitter.

12. The scan module according to claim 10 wherein the coil is wound on a bobbin having an interior, and wherein the flexible member spans the interior of the bobbin in a direction transverse to the coil axis and supports the magnet ring and, in turn, the light emitter.

13. The scan module according to claim 12, wherein the bobbin has a front end region in which the flexible member, the magnet ring and the light emitter are entirely accommodated.

14. The scan module according to claim 12, wherein the bobbin has a rear end region in which the magnet ring and the light emitter are partly accommodated.

15. A scan module, comprising:
- a light emitter for emitting light toward a surface to be scanned;
- a flexible member for supporting the light emitter for reciprocating movement relative to the surface; and
- means for reciprocating the light emitter and flexing the flexible member to sweep the light emitted by the light emitter across a portion of the surface, said reciprocating means including an energizable electromagnetic coil having a coil axis, and a permanent magnet having north and south poles spaced apart along a magnet axis generally perpendicular to the coil axis in a rest position, said permanent magnet being a solid cylinder connected to the light emitter.

16. The scan module according to claim 15, wherein the cylindrical magnet is rearwardly located on the light emitter.

17. The scan module according to claim 15; and further comprising a non-magnetic ring surrounding and holding at least a part of the light emitter.

18. The scan module according to claim 17, wherein the coil is wound on a bobbin having an interior, and wherein the flexible member spans the interior of the bobbin in a direction transverse to the coil axis and supports the non-magnetic ring and, in turn, the light emitter.

19. The scan module according to claim 18, wherein the bobbin has a front end region in which the flexible member, the non-magnetic ring and the cylindrical magnet are entirely accommodated.

* * * * *